(12) United States Patent
Schevers et al.

(10) Patent No.: US 8,425,162 B2
(45) Date of Patent: Apr. 23, 2013

(54) SERVO DRILL SPINDLE

(75) Inventors: Isaac C. Schevers, Festus, MO (US);
Dennis R. Mathis, St. Peters, MO (US);
David L. Fritsche, Foristell, MO (US)

(73) Assignee: The Boeing Company, Chicago, IL (US)

( * ) Notice: Subject to any disclaimer, the term of this patent is extended or adjusted under 35 U.S.C. 154(b) by 1395 days.

(21) Appl. No.: 12/109,593

(22) Filed: Apr. 25, 2008

(65) Prior Publication Data
US 2009/0269153 A1 Oct. 29, 2009

(51) Int. Cl.
B23B 45/14 (2006.01)

(52) U.S. Cl.
USPC ........... 408/100; 408/102; 408/112; 408/124; 408/138

(58) Field of Classification Search ........... 408/17, 408/99–102, 110–112, 124, 128–129, 137–138, 408/234
See application file for complete search history.

(56) References Cited

U.S. PATENT DOCUMENTS

| 1,118,268 | A | * | 11/1914 | Coates | 408/100 |
| 2,683,375 | A | * | 7/1954 | Gerentes | 74/22 R |
| 2,859,644 | A | * | 11/1958 | Watts | 408/132 |
| 2,883,891 | A | * | 4/1959 | Robinson et al. | 408/112 |
| 3,297,066 | A | * | 1/1967 | Brouillette | 408/51 |
| 3,775,021 | A | * | 11/1973 | Langebach | 408/234 |
| 4,088,417 | A | * | 5/1978 | Kosmowski | 408/1 R |
| 4,123,187 | A | * | 10/1978 | Turner | 408/17 |
| 4,157,231 | A | * | 6/1979 | Phillips | 408/1 R |
| 4,533,284 | A | * | 8/1985 | Agius et al. | 408/92 |
| 4,890,962 | A | | 1/1990 | Nydegger | |
| 4,958,967 | A | * | 9/1990 | Adachi | 409/185 |
| 5,020,968 | A | * | 6/1991 | Yamada et al. | 415/36 |
| 5,195,853 | A | * | 3/1993 | Dooley | 408/137 |
| 5,349,337 | A | | 9/1994 | McCormick | |
| 5,613,810 | A | | 3/1997 | Bureller | |
| 6,761,513 | B2 | * | 7/2004 | Born | 408/97 |
| 6,776,562 | B2 | | 8/2004 | Morrison et al. | |
| 7,476,065 | B2 | * | 1/2009 | Suzuki et al. | 408/1 R |
| 8,118,520 | B2 | * | 2/2012 | Hintze et al. | 408/67 |

FOREIGN PATENT DOCUMENTS
JP 07299656 A * 11/1995

OTHER PUBLICATIONS

Computer translation from the JPO website of JP 07-299656, printed Jul. 13, 2012.*

* cited by examiner

Primary Examiner — Daniel Howell
(74) Attorney, Agent, or Firm — Hanley, Flight & Zimmerman, LLC

(57) ABSTRACT

A servo drill spindle includes a spindle body, an air motor slidably carried by the spindle body, a spindle extension drivingly engaged by the air motor, a cutting tool drivingly engaged by the spindle extension and a servo motor engaging the air motor and operable to advance the air motor along the spindle body.

19 Claims, 5 Drawing Sheets

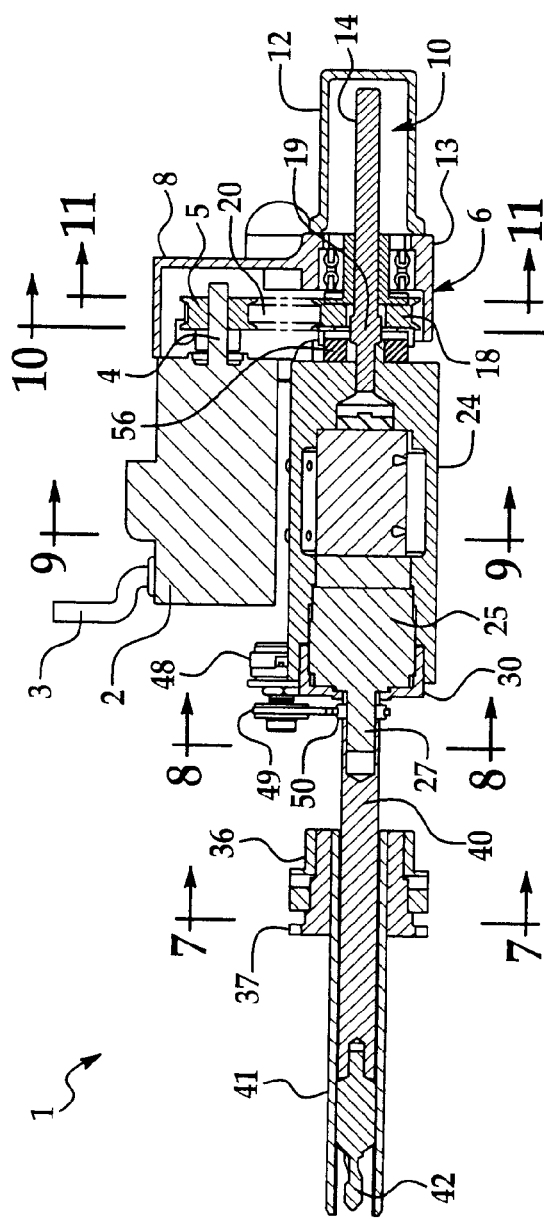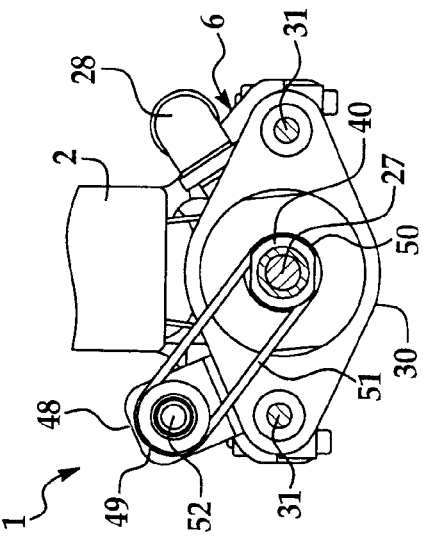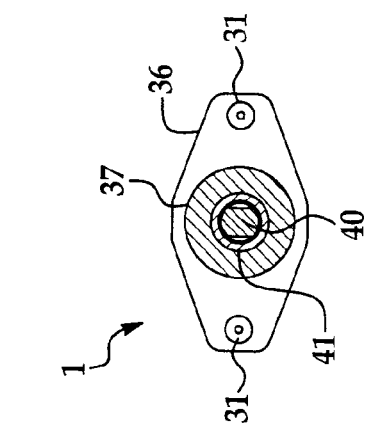
FIG. 6
FIG. 8
FIG. 7

SERVO DRILL SPINDLE

TECHNICAL FIELD

The disclosure relates to drilling apparatuses. More particularly, the disclosure relates to a servo drill spindle having precision depth control and which is capable of quickly adapting to a wide range of drilling and drill/countersinking applications.

BACKGROUND

In order to align drill development efforts with enterprise-level lean initiatives, several lean drilling systems are being developed in a new category of drilling technology identified as "portable automation". Characteristic of these drilling systems is a significant reduction in rigidity over previous drilling systems such as large floor-mounted automated drilling systems or power feed drill fixtures that clamp directly to aircraft structure and require operator repositioning of large, heavy equipment to the next location in which an opening is to be made. Consequently, the drill spindle that is positioned by these portable automation systems must be specifically developed to minimize size, weight and center of gravity in order to minimize the moment arm and corresponding deflection of the drilling system while maintaining advanced drilling features such as one-pass drill/countersinking, peck feed drilling and/or positive feed drilling.

Currently, openings may be made in a structure using one of three basic methods. According to the first method, openings may be drilled by hand (manually fed) and then countersunk by hand via a Microstop Cage. Alternatively, the openings may be drilled and countersunk to a shallow dimension and then finished by hand with a pistol grip drill motor or equivalent and a Microstop Cage. These types of openings may be located by any number of methods including but not limited to: pilot openings, manually located openings or using a fixture. According to the second method, a manual operation utilizes a much larger and heavier drill that is located and secured by rigid fixtures. This type of drill is known as "power feed" and automatically feeds the drill through the material. According to the third method, the openings are made using expensive floor-mounted, numerically-controlled machines. While attempts have been made to design a drill spindle which satisfies the requirements of these methods, each has disadvantages which drive the need for an application-specific solution.

The disadvantage of openings drilled by hand (manually fed) according to the first method above flows from the requirement that an operator manually manipulate a drill and then a countersink. As with most manual operations, quality and quantity are very operator-dependent. Producing openings via this process is also a large contributor to cumulative trauma injuries. The second method above may require that that operator manually move large, heavy drill spindles to each opening which is located by a fixture-type tool which is normally large and heavy. Should the location of a fastener opening require alteration, the fixture detail may require reworking or replacement. These types of drills may provide vary limited feed rate options and may be of a fixed nature (same feed rate for the entire operation). The third method above may have the disadvantage of requiring a large monument-type apparatus fixture which may require significant capital investment and floor space. These machines may also require large, complex, and very rigid fixtures to position the assembly precisely to the n/c machine. The dedicated nature of n/c machines and their associated programs requires that they be part-specific and require much time and expense before they can be used with another part or assembly.

SUMMARY

The disclosure is generally directed to a servo drill spindle. An illustrative embodiment of the servo drill spindle includes a spindle body, an air motor slidably carried by the spindle body, a spindle extension drivingly engaged by the air motor, a cutting tool drivingly engaged by the spindle extension and a servo motor engaging the air motor and operable to advance the air motor along the spindle body.

BRIEF DESCRIPTION OF THE ILLUSTRATIONS

FIG. 6 is a transverse sectional view, taken along section lines 6-6 in FIG. 3, of an illustrative embodiment of the servo drill spindle.

FIG. 7 is a sectional view, taken along section lines 7-7 in FIG. 6.

FIG. 8 is a sectional view, taken along section lines 8-8 in FIG. 6.

DETAILED DESCRIPTION

Figure 1:
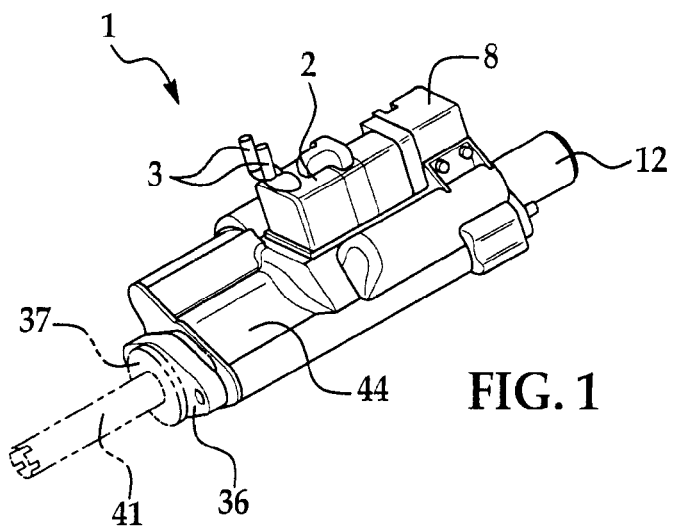
FIG. 1 is a perspective view of an illustrative embodiment of the servo drill spindle.
Figure 2:
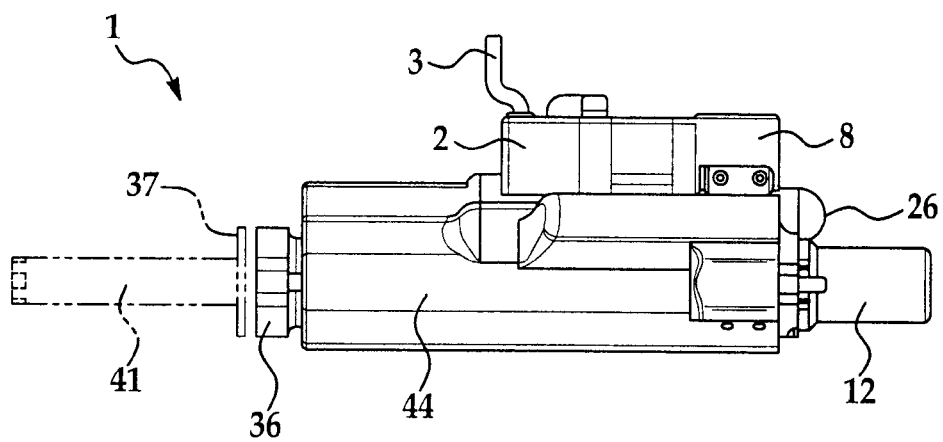
FIG. 2 is a side view of an illustrative embodiment of the servo drill spindle.
Figure 3:
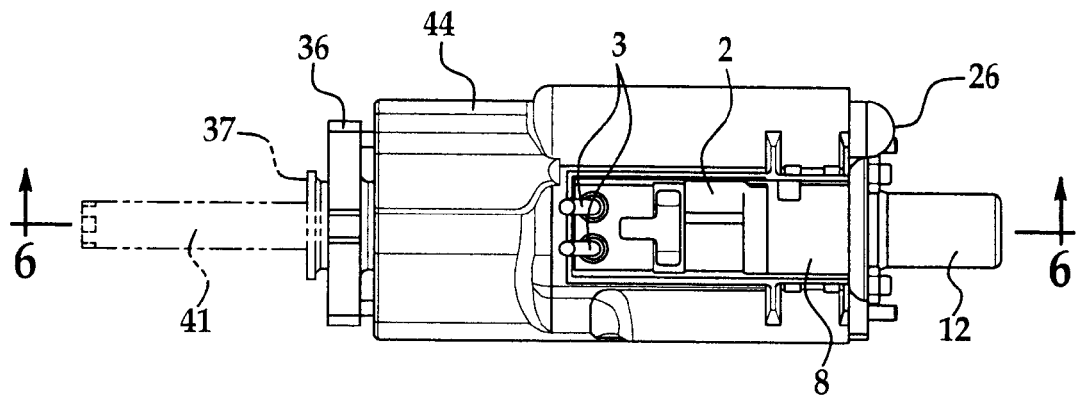
FIG. 3 is a top view of an illustrative embodiment of the servo drill spindle.
Figure 4:
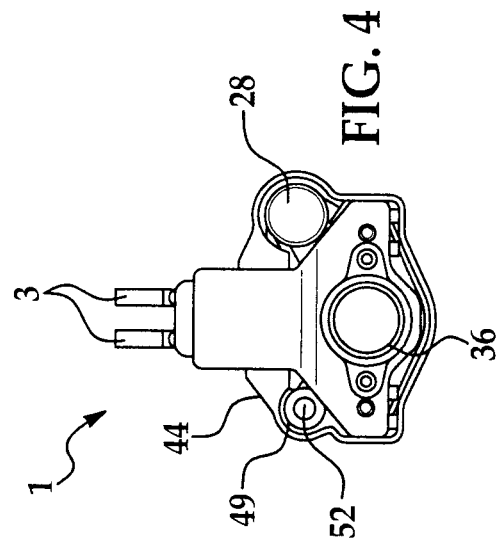
FIG. 4 is a front view of an illustrative embodiment of the servo drill spindle.
Figure 5:
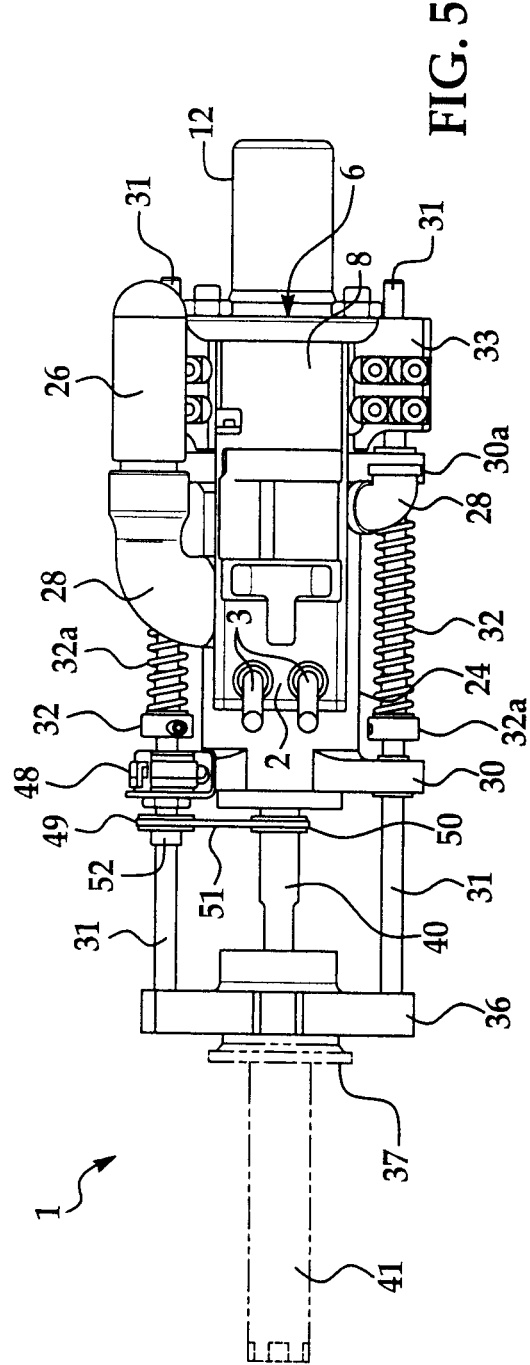
FIG. 5 is a top view of an illustrative embodiment of the servo drill spindle, with a cover removed from the spindle.
Figure 9:
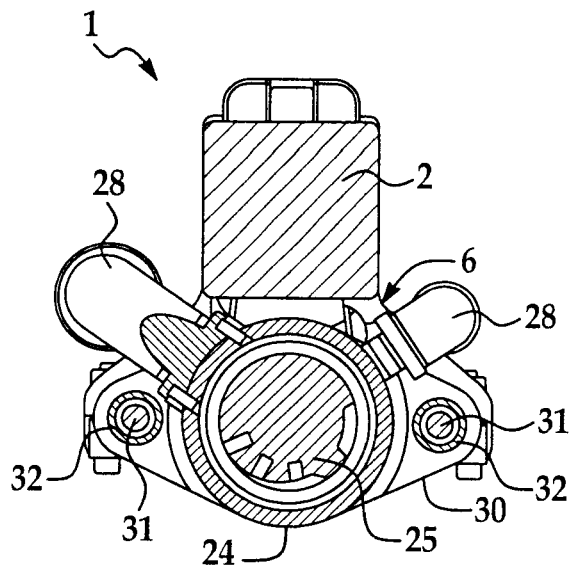
FIG. 9 is a sectional view, taken along section lines 9-9 in FIG. 6.

Referring initially to FIGS. 1-11 of the drawings, an illustrative embodiment of the servo drill spindle, hereinafter spindle, is generally indicated by reference numeral 1. The spindle 1 may include a spindle body 6. As shown in FIG. 6, an air motor housing 24 may be attached to and slidably mounted with respect to the spindle body 6 typically in a manner which will be hereinafter described. An air motor 25, which drivingly engages an air motor shaft 27 (FIGS. 5, 6 and 8), is provided in the air motor housing 24. As shown in FIG. 5, an air outlet or muffler 26, from which extends an air supply conduit 28, is provided on the spindle body 6. The air supply conduit 28 communicates with the air motor 25 to facilitate operation of the air motor 25.

As shown in FIGS. 5, 6 and 8, an encoder 48 may be provided on the air motor housing 24. An encoder shaft 52 may extend from the encoder 48. An encoder pulley 49 may be provided on the encoder shaft 52. A motor shaft pulley 50 may be provided on the air motor shaft 27 of the air motor 25. An encoder belt 51 may couple the encoder pulley 49 to the motor shaft pulley 50. Accordingly, upon rotation of the air motor shaft 27 by operation of the air motor 25, rotation is transmitted from the air motor shaft 27 to the encoder shaft 52 and encoder 48 through the encoder belt 51.

Figure 10:
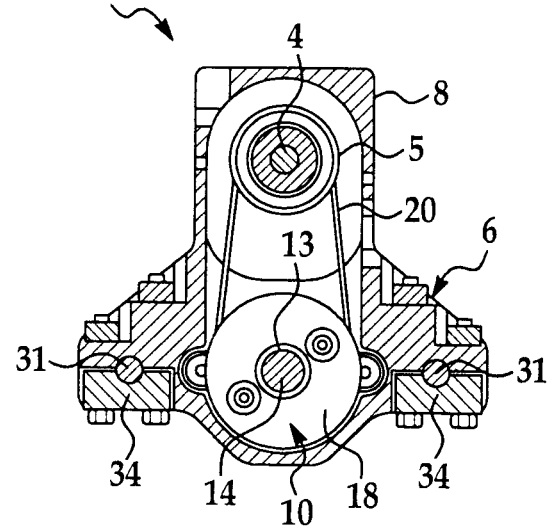
FIG. 10 is a sectional view, taken along section lines 10-10 in FIG. 6.
Figure 11:
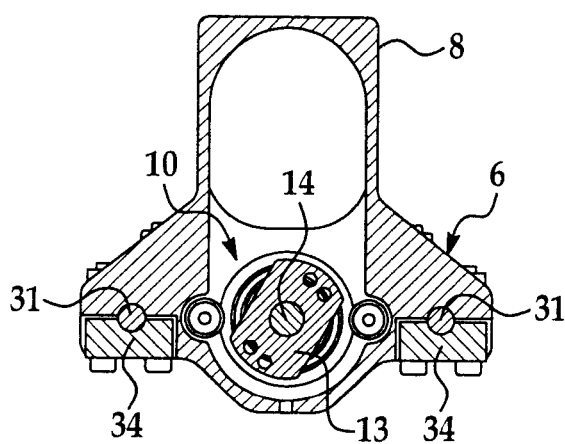
FIG. 11 is a sectional view, taken along section lines 11-11 in FIG. 6.

The air motor housing 24 may be attached to and slidably mounted with respect to the spindle body 6 according to any suitable technique which is known by those skilled in the art. As shown in FIG. 5, in some embodiments a guide rod 31 may extend along each side of the spindle body 6. Each guide rod 31 may be attached to the spindle body 6 by a guide rod mount bracket 33 (FIG. 6). Each guide rod 31 may extend through a front guide rod bracket 30 (FIGS. 5, 6 and 8) and a rear guide rod bracket 30a which extend from the air motor housing 24, with the front guide rod bracket 30 and the rear guide rod bracket 30a slidably mounted along the guide rods 31. As shown in FIG. 10, at least one guide rod clamp 34 may additionally secure each guide rod 31 to the spindle body 6. As shown in FIG. 5, a spring retainer disk 32a (one of which is shown) may be provided on each guide rod 31. A guide rod spring 32 may be provided on the guide rod 31 and interposed between each spring retainer disk 32a and the rear guide rod bracket 30a. Accordingly, the guide rod springs 32 may bias the air motor housing 24 rearwardly on the guide rods 31 to dissipate any backlash which may occur in a ball screw 14, which will be hereinafter described, during operation of the spindle 1.

A servo motor 2 is provided on the spindle body 6 and operably engages the air motor housing 24 in such a manner as to facilitate bidirectional (forward and reverse) movement of the air motor housing 24 on the guide rods 31. The servo motor 2 may include servo motor wiring 3 which is connected to a suitable electrical power supply (not shown). As shown in FIG. 6, a ball screw assembly 10 may be mounted in the spindle body 6 to transmit rotational movement generated by the servo motor 2 into bidirectional linear movement of the air motor housing 24 on the guide rods 31. In some embodiments, a servo motor shaft 4 is drivingly engaged by the servo motor 2. A servo motor step pulley 5 is provided on the servo motor shaft 4. The ball screw assembly 10 may include a ball screw bearing 13 which is provided on the spindle body 6. A ball screw 14 extends through and is freely rotatable in the ball screw bearing 13 and engages the air motor housing 24. A ball screw nut 19 threadably engages the ball screw 14. A ball screw step pulley 18 is provided on the ball screw nut 19. A pulley belt 20 engages the servo motor step pulley 5 on the servo motor shaft 4 and the ball screw step pulley 18 on the ball screw 14. Accordingly, operation of the servo motor 2 facilitates rotation of the servo motor shaft 4, from which rotation is transmitted to the ball screw nut 19 through the pulley belt 20 and ball screw step pulley 18. The rotating ball screw nut 19 advances the ball screw 14 forwardly or rearwardly depending on the direction of operation of the servo motor 2. Operation of the servo motor 2 in a first direction facilitates forward advancement of the air motor housing 24 on the guide rods 31, whereas operation of the servo motor 2 in a second direction facilitates reverse advancement of the air motor housing 24 on the guide rods 31. As further shown in FIG. 6, a pulley housing 8 may enclose the servo motor shaft 4 and the servo motor step pulley 5. A ball screw housing 12 may enclose a rearwardly-extending portion of the ball screw 14. As further shown in FIG. 6, a brake mechanism 56 may be provided on the body 6.

As further shown in FIGS. 5 and 6, a spindle extension 40 is drivingly engaged by the air motor shaft 27 of the air motor 25. The spindle extension 40 may extend between the guide rods 31, as shown in FIG. 5. A cutting tool may be drivingly engaged by the spindle extension 40. The cutting tool may include, for example, a drill bit 42 which is drivingly engaged by the spindle extension 40. The cutting tool may further include a drill-countersink cutter 41 which may drivingly engaged by the spindle extension 40 and fit over the spindle extension 40 and the drill bit 42, as shown in FIG. 6. A transfer housing 36 may be provided on the guide rods 31. The drill-countersink cutter 41 may extend through an opening (not shown) provided in the transfer housing 36. The transfer housing 36 may include mounting threads (not shown) which facilitate the mounting of a drill bushing 37 of a selected type, depending on the drilling application, on the drill/countersink cutter 41. In some embodiments, the transfer housing 36 may be attached to the guide rods 31 using a pair of threaded fasteners (not shown). Accordingly, the transfer housing 36 may be easily replaced on the guide rods 31 by removing the fasteners to accommodate any number of drill bushing mounting threads (not shown) depending on the desired drilling application of the spindle 1.

As shown in FIGS. 1-4, in some embodiments at least one cover 44 may enclose the spindle body 6 and the air motor housing 24 of the spindle 1. The cover or covers 44 may be fabricated using selective laser sintering, for example, to generate the complex geometries required to cover all moving parts and pinch points of the spindle 1. The cover or covers 44 may also contribute to the ergonomics of the spindle 1 by eliminating sharp corners and insulating the air motor housing 24 which is chilled due to the flow of compressed air during operation of the spindle 1.

In typical use of the spindle 1, the drill/countersink cutter 41 and the drill bit 42 are drivingly coupled to the spindle extension 40. The transfer housing 36 is attached to the guide rods 31 typically using a pair of fasteners (not shown). A drill bushing 37 of selected design is attached to the transfer housing 36. The servo motor wiring 3 of the servo motor 2 is connected to a suitable electrical power source (not shown).

As the air motor 25 is operated to rotate the spindle extension 40, the drill/countersink cutter 41 and the drill bit 42, the servo motor 2 may be operated to advance the air motor housing 24 forwardly on the guide rods 31 and the drill/countersink cutter 41 and the drill bit 42 into contact with and then through a workpiece (not shown) through which an opening is to be drilled using the spindle 1. After drilling of the opening in the workpiece is completed, the servo motor 2 may be operated in the reverse direction to reverse the direction of the air motor housing 24 on the guide rods 31 and retract the drill/countersink cutter 41 and drill bit 42 from the opening.

Throughout operation of the spindle 1, the guide rod springs 32 may bias the air motor housing 24 rearwardly on the guide rods 31 in order to dissipate any backlash which may be in the ball screw 14 of the ball screw assembly 10. This ensures accurate and consistent depth control which may be required to meet countersink tolerances (typically 0.010" range in countersink diameter which translates into only 0.004" in depth). The brake mechanism 56 may be adapted to sense the travel limit of the ball screw 14 in the fully-retracted position of the air motor housing 24 until a marked position of the servo motor 2 is reached. This establishes a repeatable home position of the air motor housing 24 on the guide rods 31.

The spindle 1 may have the capability to produce drilled and countersunk fastener openings of up to about ¼" diameter in stack-ups of composite, aluminum or combinations of composite and aluminum up to ⅝" thick. The spindle 1 may be programmed to rapidly advance the drill bit 42 and drill/countersink cutter 41 to the workpiece; drill through the material at a specific feed rate while maintaining a constant chip load even as the spindle changes; peck in and out of the material to break up chips and reduce erosion of the opening; rapidly advance to the countersink portion of the cutter; reduce the feed rate for countersinking; stop feeding at a very controlled depth to maintain a 0.010" countersink diameter tolerance; dwell for a specific amount of time to ensure that a full countersink is produced; and retract back to the starting position. All of these parameters may be programmable and repeatable from the drilling of one opening to the next.

In order to achieve the bare minimum size and weight of the spindle 1, the servo motor 2 may rotate the ball screw nut 19 to achieve spindle feed rather than using the traditional method of directly rotating the ball screw 14. This unique design may facilitate weight and center of gravity requirements for the spindle 1. The servo motor 2 may drive the ball screw nut 19 using a cog-type pulley belt 20 and the servo motor step pulley 5 and ball screw step pulley 18. The ratio of the pulleys 5, 18 may afford the opportunity of multiplying the drilling thrust of the spindle extension 40, the drill/countersink cutter 41 and the drill bit 42 without significantly affecting the weight of those components. A closed feedback control loop may be used to maintain constant chip load and add virtually no weight to the spindle 1. In order to reduce overall weight and keep the reaction forces which are generated by the drilling process aligned along the center of the spindle 1, the air motor 25 may travel forwardly on the two diametrically-opposed guide rods 31 rather than inside a fully-enclosed housing or along guide rods situated on one side of the spindle 1. The guide rod springs 32 provided on the respective guide rods 31 may bias the ball screw 14 rearwardly, eliminating backlash and ensuring countersink depth control and repeatability. The feed force may be applied directly along the centerline of the reacting force (the drill/countersink thrust) to ensure accuracy and smooth movement. In order to minimize size and weight of the spindle 1, every component which does not require direct contact with the spindle extension 40 may be housed in a remote control cabinet. This may include solenoid control valves, lubricators for the cutter and drill motor, controllers, etc. The spindle 1 can be configured to satisfy a variety of drilling applications due to the programmable feed, adjustable drill bushing position (to accommodate a wide range of cutter lengths) and replaceable drill bushing mounting plate to facilitate the use of any standard STD-138BD locking collar size. Furthermore, the total stroke of the spindle 1 may be easily increased by using longer guide rods 31 and a longer ball screw 14.

Figure 12:
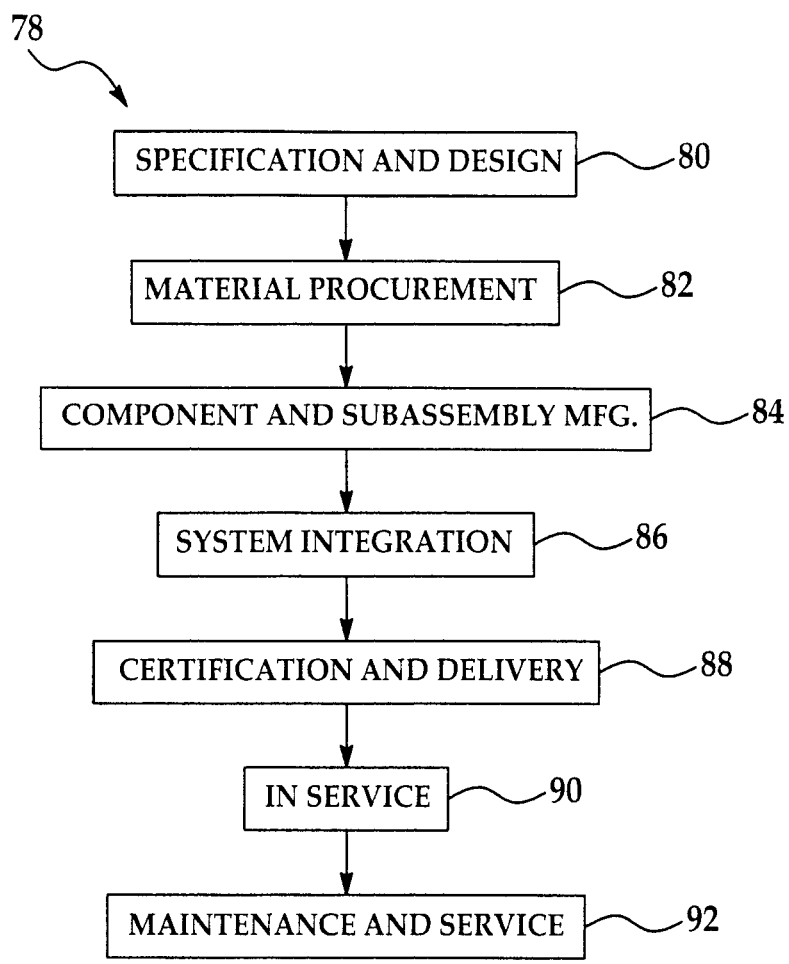
FIG. 12 is a flow diagram of an aircraft production and service methodology.
Figure 13:
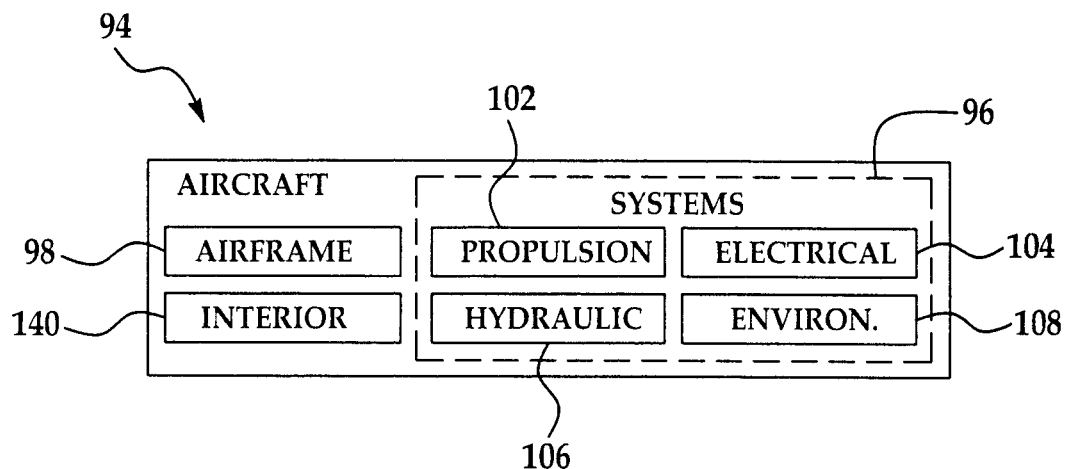
FIG. 13 is a block diagram of an aircraft.

Referring next to FIGS. 12 and 13, embodiments of the disclosure may be used in the context of an aircraft manufacturing and service method 78 as shown in FIG. 12 and an aircraft 94 as shown in FIG. 13. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A servo drill spindle, comprising:
   a spindle body;
   a pair of guide rods carried by the spindle body;
   an air motor housing slidably carried by the pair of guide rods;
   an air motor provided in the air motor housing;
   a spindle extension drivingly engaged by the air motor;
   a cutting tool drivingly engaged by the spindle extension; and
   a servo motor engaging the air motor and operable to advance the air motor along the spindle body; and
   an encoder carried by the spindle body and drivingly engaged by the spindle extension.

2. The servo drill spindle of claim 1 further comprising a motor shaft pulley drivingly engaged by the spindle extension, an encoder belt drivingly engaged by the motor shaft pulley and an encoder pulley drivingly engaged by the encoder belt and drivingly engaging the encoder.

3. A spindle apparatus comprising:
   a spindle body;
   a guide rod coupled to the spindle body, the guide rod to slidably couple a first motor to the spindle body, the first motor to rotate a cutting tool coupled to an output shaft of the motor;
   a spring positioned on the guide rod, the spring to bias the first motor in a direction away from the cutting tool to dissipate backlash during operation of the spindle; and
   an encoder coupled to a housing of the first motor via a bracket, the encoder to be driven by the output shaft of the first motor.

4. The apparatus of claim 3, wherein the spring is to continuously bias the first motor in a direction away from the cutting tool.

5. The apparatus of claim 3, wherein an axis of the guide rod is positioned adjacent an axis of the spindle body, the axis of the guide rod being parallel relative to the axis of the spindle body.

6. The apparatus of claim 3, further comprising a second motor to move the first motor relative to the spindle body via the guide rod.

7. The apparatus of claim 6, further comprising a ball screw assembly coupled to the second motor, the ball screw assembly to convert rotational motion of the second motor into rectilinear motion to move the first motor along the guide rod relative to the spindle body.

8. The apparatus of claim 7, wherein the ball screw assembly comprises a ball screw bearing coupled to the spindle body, a ball screw to extend through the ball screw bearing, and a ball screw nut to threadably engage the ball screw.

9. The apparatus of claim 8, further comprising a second motor pulley coupled to a ball screw pulley via a belt, the second motor to drive the second motor pulley which, in turn, is to drive the ball screw pulley via the belt.

10. A spindle apparatus comprising:
a spindle body;
a first guide rod coupled to a first side of the spindle body, the first guide rod having a first spring;
a second guide rod coupled to a second side of the spindle body, the second guide rod having a second spring;
an air motor housing slidably coupled to the spindle body via the first and second guide rods, the first and second springs to continuously bias the motor housing; and
a servo motor to cause the air motor housing to slide on the guide rods relative to the spindle body, the first and second springs to compress and decompress as the air motor housing slides relative to the spindle body along the guide rods.

11. The apparatus of claim 10, wherein the first side of the spindle body is opposite the second side.

12. The apparatus of claim 10, wherein the each of the first and second guide rods is coupled to the spindle body via a rear guide rod mount bracket and a front guide rod bracket, the front guide rod bracket having apertures to enable the first and second guide rods to extend past the front guide rod bracket.

13. The apparatus of claim 10, wherein the first and second springs are positioned on the respective first and second guide rods between the front guide rod bracket and the rear guide rod bracket.

14. The apparatus of claim 13, further comprising a first spring retainer coupled to the first guide rod spaced away from the front guide rod mount bracket, and a second spring retainer disk coupled to the second guide rod spaced away from the front guide rod mount bracket.

15. The apparatus of claim 14, wherein the first spring is positioned on the first guide rod between the first spring retainer and the rear guide rod bracket and the second spring is positioned on the second guide rod between the second spring retainer and the rear guide rod bracket.

16. An apparatus comprising:
a spindle body;
a first motor coupled to the spindle body via a first motor housing, the first motor having an output shaft to rotate a cutting tool;
a second motor to move the first motor housing relative to the spindle body along a guide rod positioned adjacent the spindle body; and
an encoder coupled to the first motor housing and drivingly engaged by the first motor.

17. The apparatus of claim 16, further comprising an encoder pulley coupled to an encoder shaft extending from the encoder.

18. The apparatus of claim 17, further comprising a motor shaft pulley coupled to the output shaft of the first motor.

19. The apparatus of claim 18, further comprising an encoder belt to couple the motor shaft pulley and the encoder pulley, rotation of the output shaft to cause the encoder shaft and the encoder to rotate via the encoder belt.

* * * * *